United States Patent Office 3,451,353
Patented June 24, 1969

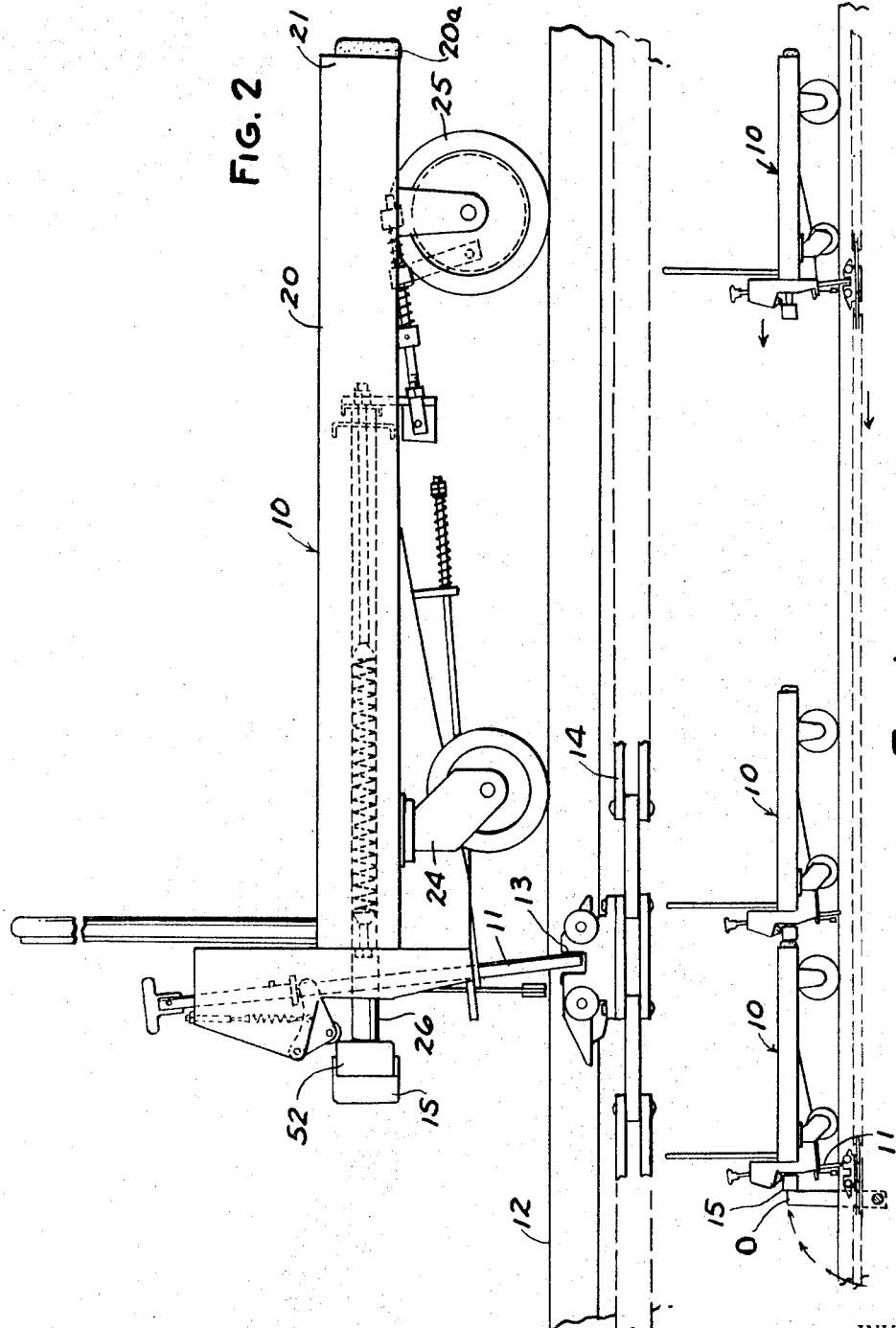

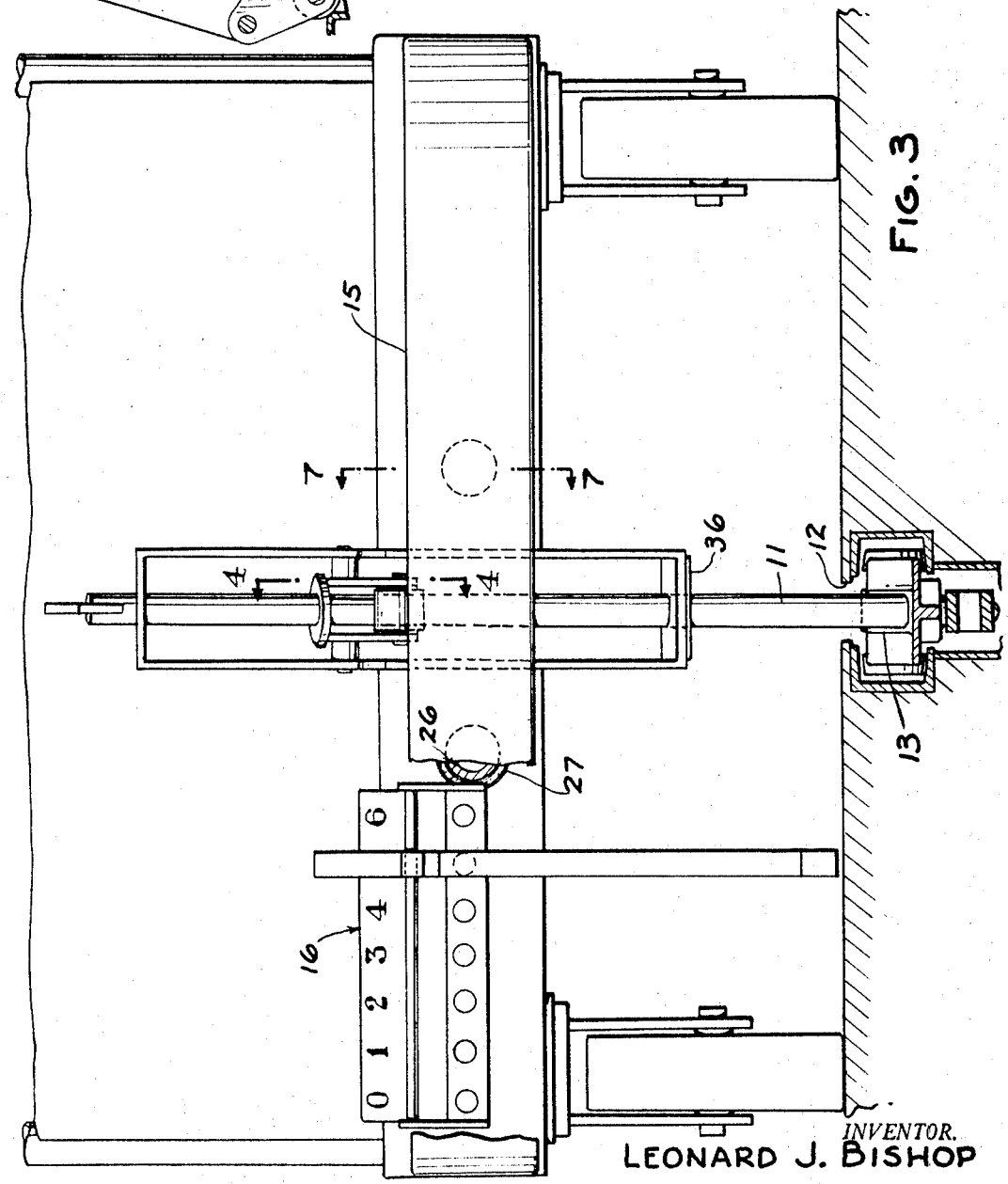

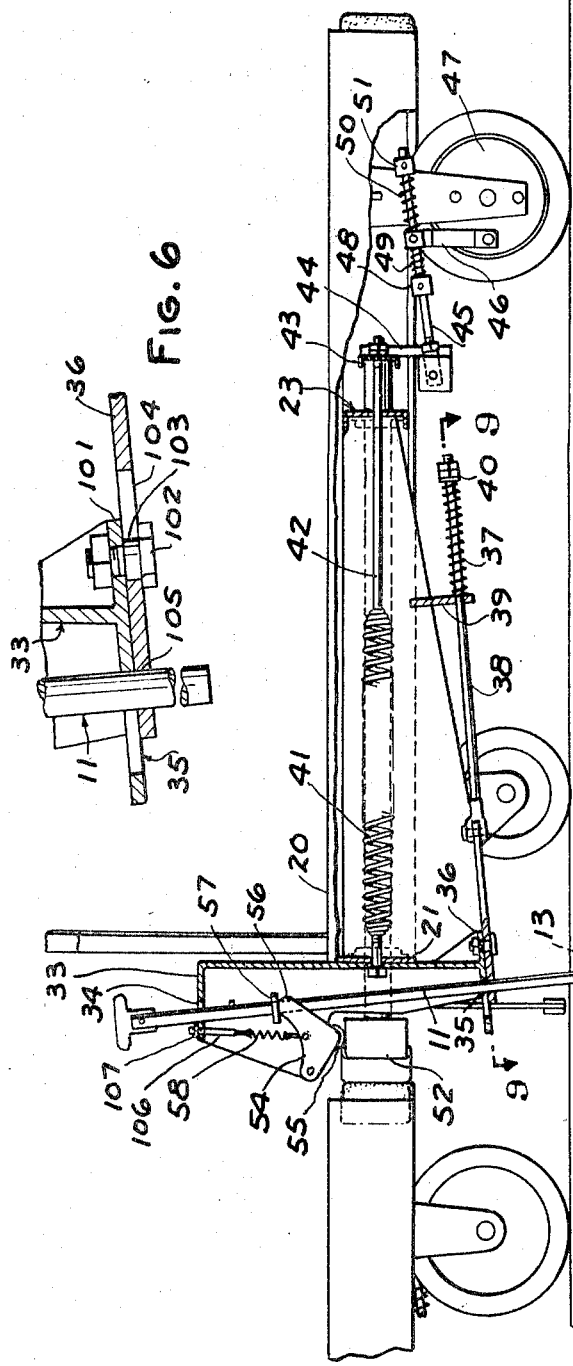
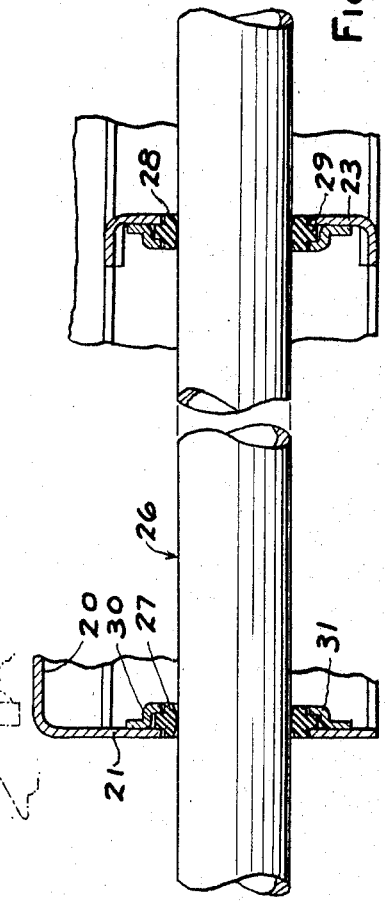

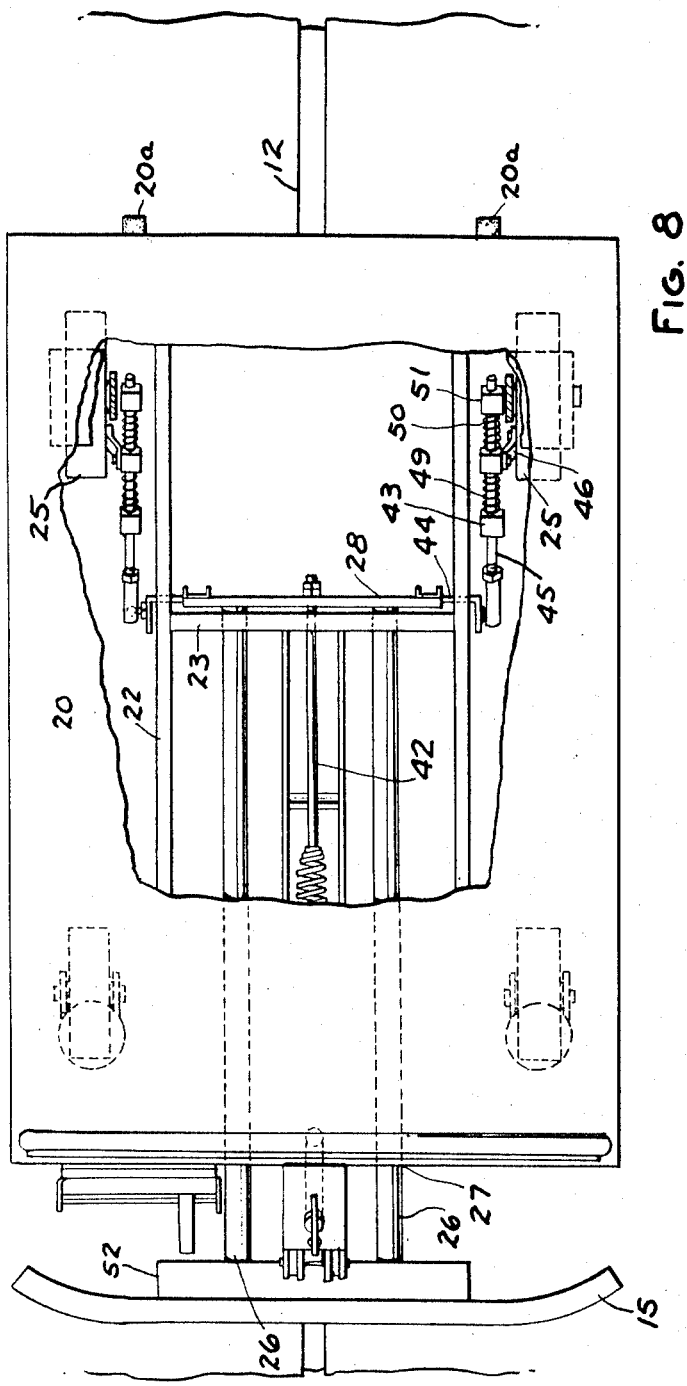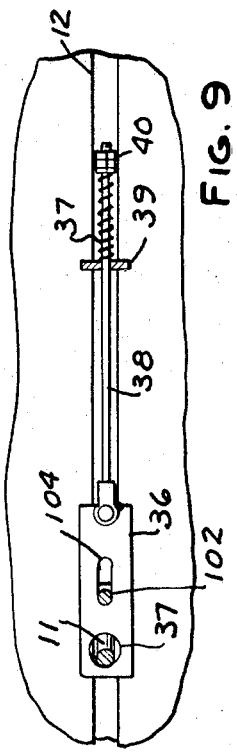

3,451,353
ACCUMULATING TOW TRUCK
CONVEYOR SYSTEM
Leonard J. Bishop, Birmingham, Mich., assignor, by mesne assignments, to American Chain & Cable Company, Inc., New York, N.Y., a corporation of New York
Filed Nov. 24, 1965, Ser. No. 509,569
Int. Cl. B60d 1/00; B60p 7/00
U.S. Cl. 104—172                            9 Claims

ABSTRACT OF THE DISCLOSURE

The accumulating tow truck conveyor system disclosed herein comprises a plurality of tow trucks adapted to be moved along a slot in the floor by engagement of the tow pin of each truck with a conveyor beneath the floor. Each truck body has a front bumper that is mounted thereon for longitudinal reciprocating movement relative to the truck body. The front bumper is operatively connected to the tow pin by an arrangement which includes a cam surface forming a portion of the bumper and movable therewith which is engaged by a member pivoted on the truck body and, in turn, engaged with the tow pin to lift the tow pin.

---

This invention relates to accumulating tow truck conveyor systems.

In tow truck conveyor systems, a plurality of tow trucks are adapted to be moved along a slot in the floor by engagement of a tow pin on a tow truck with a conveyor beneath the floor. It has heretofore been suggested that structure be provided for permitting the tow trunks to accumulate when an obstacle is encountered. Conventionally such a structure comprises a front bumper movably mounted on the front of each tow truck and adapted to be moved rearwardly and thereby lift the tow pin. As the front bumper of a leading truck encounters an obstacle, the front bumper moves rearwardly to lift the tow pin. Similarly, as each succeeding truck approaches the first or leading truck, the front bumper thereof engages the rear of a leading truck to lift the tow pin of the succeeding truck.

It is an object of this invention to provide an improved tow truck which is strong, light in weight, low in cost, which includes novel means for lifting the tow pin and includes a novel bumper construction.

In the drawings:

FIG. 1 is a partly diagrammatic elevational view of a tow truck conveyor system embodying the invention.

FIG. 2 is a side elevational view of a tow truck embodying the invention.

FIG. 3 is a front elevational view of a tow truck embodying the invention.

FIG. 4 is a fragmentary sectional view taken along the line 4—4 in FIG. 3.

FIG. 5 is a side elevational view of a pair of tow trucks showing the tow trucks in accumulated position.

FIG. 6 is a fragmentary sectional view on an enlarged scale of a portion of FIG. 5.

FIG. 7 is a fragmentary sectional view on an enlarged scale taken along the line 7—7 in FIG. 3.

FIG. 8 is a plan view of a tow truck embodying the invention, parts being broken away.

FIG. 9 is a fragmentary sectional view taken along the line 9—9 in FIG. 5.

Referring to FIG. 1, the tow truck conveyor system embodying the invention comprises a plurality of tow trucks 10, each of which has a tow pin 11 that is adapted to extend downwardly to a slot 12 in the floor and engage the pusher trolley dog 13 of a conveyor chain 14 beneath the floor so that the tow trucks are pulled along the slot. In order that the conveyors will accumulate when an obstacle O is encountered, each tow truck is constructed such that it has a front bumper 15 which is adapted to be moved rearwardly upon encountering an obstacle to lift the tow pin 11 out of engagement with the pusher dog 13 on the chain 14. The tow truck may also be provided with a signal system 16 (FIG. 3) which is adapted to actuate a switching mechanism in order that the tow truck can be transferred to a spur conveyor in accordance with the signal. The latter construction forms no part of the present invention.

Referring to FIGS. 2 and 5 each tow truck 10 comprises a platform 20 having a peripheral flange 21 and is made of sheet metal. The platform 20 is strengthened by longitudinally extending structural members 22 (FIG. 8) that are spaced inwardly from the sides of the platform and extend substantially throughout the length of the platform and by a cross member 23 that extends between the longitudinally extending members 22 at a point beyond the mid point of the truck body toward the rear of the truck body. Swiveled castered wheels 24 are mounted on the front end of the truck body and conventional wheels 25 are provided on the rear end of the truck body. Rubber bumper pads 20a are provided along the rear.

The bumper 15 is generally channel shaped in cross cross section and is mounted on a pair of tubular rods 26 which extend through bearings 27, 28 (FIG. 7) in the front flange 21 and cross member 23 respectively. The bearings are preferably annular and comprise a low friction material such as bronze. Each bearing includes a peripheral flange 29 which extends into a groove 30 formed by an annular ring 31 welded to the respective flange or cross member. The bore of each bearing 27, 28 has a convex cross section so that precise axial alignment of the bearings is not required. Also, the bearings 27 are mounted with a small amount of radial float to avoid binding due to small errors in spacing across the two tubes 26. Since the cross member 23 is positioned rearwardly of the front end of the truck beyond the mid-point of the truck, a rigid support of the front bumper 15 is obtained that permits movement of bumper 15 even when an off center load is applied to the bumper.

As shown in FIG. 5, a bracket 33 is mounted on the front end of the truck and has spaced openings 34, 35 therein in which tow pin 11 extends generally vertically. The opening 34 is slightly larger in diameter than the tow pin to avoid binding when the bottom end of the tow pin swings forward in a manner to be described. The opening 35 consists of a slot to permit such forward swinging. Just below the bracket 33 a plate 36 is movably mounted on an integral backward extension 101 of bracket 33 by means of a shoulder stud 102 which is tightly secured to extension 101 by a lock washer and two nuts. The body 103 of stud 102 is contained inside a slot 104 in plate 36. Plate 36 is provided with a loose fitting bore 105 through which the tow pin 11 passes. When the bottom end of the tow pin is moved forward due to the towing pressure, it follows the slot 35 and pulls the plate 36 along while the slot 104 moves relative to the fixed stud 104. The enlarged head of this stud holds up plate 36. The plate is yieldingly urged rearwardly by a spring 37 telescoped on a rod 38 and interposed between a fixed flange 39 and nuts 40 on the end of rod 38. This arrangement permits the tow pin to yieldingly move forwardly when it is first engaged by a pushed dog 13 on conveyor 14, thereby assisting in absorbing the shock. Such a construction is disclosed and claimed in the patent to Klamp 3,015,284.

As shown in FIGS. 5 and 7, a spring 41 is fixed at one end to the front of the tow truck and at its other end through a rod 42 to a cross member 43 extending between the rods 26. This yieldingly urges the front bumper forwardly. Brackets 44 are fastened to the cross member 43 and an operating rod 45 is pivoted to each bracket 44 and extends to an operating lever 46 of a brake 47 on the rear wheels 25. When the front bumper 15 is moved rearwardly upon encountering an obstacle, each bracket 44 is in turn moved rearwardly, moving the rods 45 and causing an abutment 48 on the rods 45 to compress a spring 49 and engage lever 46 to apply the brake 47. A second spring 50 interposed between lever 46 and a stop 51 on the end of rod 45 assists in release of lever 46 and in turn the brake when the front bumper again moves forwardly under the action of spring 41 when the obstacle is removed.

Referring to FIGS. 3, 4, 5 and 7, the front bumper 15 includes a cam surface 52 that extends rearwardly from the front bumper. A tow pin operating lever 54 is pivoted to the bracket 33 at one end and has a roller 55 thereon intermediate its ends which is adapted to engage cam plate 52 to pivot the lever upwardly. The free ends 56 of the forked lever 54 engage a flange 57 on tow pin 11 to lift the tow pin. As shown, the longitudinal length of the cam surface of the plate 52 is sufficiently great to permit substantial longitudinal movement of the front bumper even after the tow pin has been lifted, the roller 55 riding on the cam plate throughout this movement. A tension spring 58 is provided between the lever 54 and the bracket 33 and serves to partially counter-balance the weight of the lever 54 and tow pin 11. The upper end of the spring 58 is connected to a stud 106 which allows spring tension adjustment through nuts 107, which are locked against each other after adjustment. This spring arrangement provides a very sensitive adjustment so that a moving tow truck exerts only a light pressure against a human or other obstacle while the tow pin is being lifted.

In operation, when a tow truck encounters an obstacle, the front bumper 15 is moved rearwardly which causes the roller 55 to engage the cam surface 52 and thereby lift the tow pin. At the same time, the further movement of the front bumper rearwardly applies the brake. The arrangement is preferably such that the tow pin is lifted first and then continued movement of the front bumper applies the brake. Since the face of the bumper remains in the same plane at all times, the forces imposed on the rear of a preceding truck are distributed more uniformly.

I claim:

1. In a truck for use with a conveyor, the combination comprising
   a truck body adapted to be moved along by a conveyor,
   means on truck body movable into and out of engagement with means on the conveyor,
   a front bumper,
   a pair of transversely spaced rods extending longitudinally of the truck body on which said front bumper is mounted,
   said truck body having a pair of longitudinally spaced bearings thereon individual to each said rod through which the rod extends and whereby the rod is mounted for longitudinal reciprocating straight line movement relative to the truck body,
   yielding means urging said front bumper forwardly of the truck body,
   means on said front bumper operatively engaging said movable means on said truck body for moving said means on said truck body out of engagement with said means on the conveyor when the front bumper engages an obstacle,
   said last-mentioned means including a cam surface forming a portion of said bumper and movable therewith,
   a member pivoted on said truck body and adapted to be engaged by said cam surface as the bumper is moved rearwardly,
   said member engaging said conveyor engaging means for lifting said conveyor engaging means out of engagement with said conveyor,
   said cam surface having a longitudinal extent such that the front bumper may be moved rearwardly of the truck body a distance even after said conveyor engaging means have been moved out of engagement with said conveyor.

2. The combination set forth in claim 1 wherein said body includes a platform,
   a pair of longitudinally extending structural members spaced from the side edges of said platform and extending throughout substantially the entire length of said body,
   cross members extending between and joining said longitudinally extending structural members,
   said bearings being in said cross members.

3. The combination set forth in claim 1 wherein said bearings comprise substantially annular solid members of low friction material.

4. In a truck for use with a conveyor, the combination comprising
   a truck body adapted to be moved along by a conveyor,
   means on truck body movable into and out of engagement with means on the conveyor,
   a front bumper,
   a pair of transversely spaced rods extending longitudinally of the truck body on which said front bumper is mounted,
   said truck body having a pair of longitudinally spaced bearings thereon individual to each said rod through which the rod extends and whereby the rod is mounted for longitudinal reciprocating movement relative to the truck body,
   yielding means urging said front bumper forwardly of the truck body,
   means on said front bumper operatively engaging said movable means on said truck body for moving said means on said truck body out of engagement with said means on the conveyor when the front bumper engages an obstacle,
   said last-mentioned means including a cam surface on said bumper,
   a member pivoted on said truck body and adapted to engage said cam surface,
   said member engaging said conveyor engaging means for lifting said conveyor engaging means out of engagement with said conveyor,
   said cam surface having a longitudinal extent such that the front bumper may be moved rearwardly of the truck body a distance even after said conveyor engaging means have been moved out of engagement with said conveyor,
   said conveyor engaging means comprising a tow pin mounted for generally vertical movement at the front end of said truck body,
   said interengaging means comprising a plate pivoted to the front end of said body about a horizontal axis,
   said plate having a roller thereon engaging said cam surface on the front bumper,
   said lever having a free end thereof engaging said tow pin to cause said tow pin to move upwardly when the roller engages the cam surface on the front bumper.

5. The combination set forth in claim 4 including adjustable spring means counterbalancing the weight of said lever and part of the tow pin weight.

6. In a truck for use with a conveyor, the combination comprising
   a truck body adapted to be moved along by a conveyor, means on truck body movable into and out of engagement with means on the conveyor, a front bumper, a pair of transversely spaced rods extending longitudinally of the truck body on which said front bumper is mounted, said truck body having a pair of longitudinally spaced bearings thereon individual to each said rod through which the rod extends and whereby the rod is mounted for longitudinal reciprocating movement relative to the truck body, the longitudinal distance between said bearings being greater than one half the length of said truck body, yielding means urging said front bumper forwardly of the truck body, means on said front bumper operatively engaging said movable means on said truck body for moving said means on said truck body out of engagement with said means on the conveyor when the front bumper engages an obstacle, said body including a platform, a pair of longitudinally extending structural members spaced from the side edges of said platform and extending throughout substantially the entire length of said body, cross members extending between and joining said longitudinally extending structural members, said bearings being in said cross members, said bearings comprising annular solid members of low friction material, said conveyor engaging means comprising a tow pin mounted for generally vertical movement at the front end of said truck body, said interengaging means comprises a plate pivoted to the front end of said body about a horizontal axis, said plate having a roller thereon engaging said cam surface on the front bumper, said lever having a free end thereof engaging said tow pin to cause said tow pin to move upwardly when the roller engages the cam surface on the front bumper, and adjustable spring means counterbalancing the weight of said lever and part of the tow pin weight.

7. In a truck for use with a conveyor, the combination comprising a truck body adapted to be moved along by a conveyor, means on truck body movable into and out of engagement with means on the conveyor, a front bumper, means for movably mounting the front bumper on the truck body, yielding means urging said front bumper forwardly of the truck body, means on said front bumper operatively engaging said movable means on said truck body for moving said means on said truck body out of engagement with said means on the conveyor when the front bumper engages an obstacle, said last-mentioned means including a cam surface on said bumper, a member pivoted on said truck body and adapted to engage said cam surface, said member engaging said conveyor engaging means for lifting said conveyor engaging means out of engagement with said conveyor, said cam surface having a longitudinal extent such that the front bumper may be moved rearwardly of the truck body a distance even after said conveyor engaging means have been moved out of engagement with said conveyor, said conveyor engaging means comprising a tow pin mounted for generally vertical movement at the front end of said truck body, said interengaging means comprising a plate pivoted to the front end of said body about a horizontal axis, said plate having a roller thereon engaging said cam surface on the front bumper, said lever having a free end thereof engaging said tow pin to cause said tow pin to move upwardly when the roller engages the cam surface on the front bumper.

8. In a truck for use with a conveyor, the combination comprising a truck body adapted to be moved along by a conveyor, means on truck body movable into and out of engagement with means on the conveyor, a front bumper, a pair of transversely spaced rods extending longitudinally of the truck body on which said front bumper is mounted, said truuk body having a pair of longitudinally spaced bearings thereon individual to each said rod through which the rod extends and whereby the rod is mounted for longitudinal reciprocating movement relative to the truck body, the longitudinal distance between said bearings being greater than one half the length of said truck body, yielding means urging said front bumper forwardly of the truck body, means on said front bumper operatively engaging said movable means on said truck body for moving said means on said truck body out of engagement with said means on the conveyor when the front bumper engages an obstacle, said body including a platform, a pair of longitudinally extending structural members spaced from the side edges of said platform and extending throughout substantially the entire length of said body, cross members extending between and joining said longitudinally extending structural members, said bearings being in said cross members.

9. The combination set forth in claim 8 wherein said bearings comprise annular solid members of low friction material.

References Cited

UNITED STATES PATENTS

| 3,094,944 | 6/1963 | Bradt | 104—172 |
| 3,103,895 | 9/1963 | Bradt | 104—172 X |

ARTHUR L. LA POINT, *Primary Examiner.*

DANIEL F. WORTH III, *Assistant Examiner.*

U.S. Cl. X.R.

104—178